United States Patent
Guntupalli et al.

(10) Patent No.: US 12,175,256 B2
(45) Date of Patent: Dec. 24, 2024

(54) SYSTEMS AND METHODS FOR DEPLOYING A DISTRIBUTED CONTAINERS-AS-A-SERVICE PLATFORM ARCHITECTURE FOR TELECOMMUNICATIONS APPLICATIONS

(71) Applicant: Verizon Patent and Licensing Inc., Basking Ridge, NJ (US)

(72) Inventors: Anil K. Guntupalli, Irving, TX (US); Niranjan B. Avula, Frisco, TX (US); Eric J. Maiz, Washington, NJ (US); Baijian Zhang, Frisco, TX (US); Yang Xu, Basking Ridge, NJ (US); Xiaobo Wang, Southlake, TX (US); Cheng Liu, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 17/653,974

(22) Filed: Mar. 8, 2022

(65) Prior Publication Data
US 2023/0289193 A1 Sep. 14, 2023

(51) Int. Cl.
G06F 9/44 (2018.01)
G06F 8/61 (2018.01)
G06F 9/4401 (2018.01)
H04W 24/08 (2009.01)

(52) U.S. Cl.
CPC ............ *G06F 9/4416* (2013.01); *G06F 8/63* (2013.01); *G06F 9/4406* (2013.01); *H04W 24/08* (2013.01)

(58) Field of Classification Search
CPC ..................................................... G06F 9/4416
See application file for complete search history.

(56) References Cited

U.S. PATENT DOCUMENTS

| | | | |
|---|---|---|---|
| 7,571,154 B2 * | 8/2009 | Emeis ................ | G06F 9/5044 709/203 |
| 8,037,290 B1 * | 10/2011 | Stutton ............... | G06F 21/575 713/1 |
| 11,323,325 B1 * | 5/2022 | Hullahalli .......... | H04L 41/40 |
| 2007/0192447 A1 * | 8/2007 | Huynh ................ | H04L 63/105 709/220 |
| 2010/0192145 A1 * | 7/2010 | Liles .................. | G06F 8/60 717/174 |
| 2010/0306337 A1 * | 12/2010 | DeHaan .............. | G06F 8/63 709/213 |
| 2013/0167133 A1 * | 6/2013 | Cao .................... | G06F 8/65 717/172 |
| 2016/0077816 A1 * | 3/2016 | Eilam ................. | G06F 8/65 717/177 |
| 2017/0324667 A1 * | 11/2017 | Camacho ........... | H04M 1/724098 |
| 2018/0115519 A1 * | 4/2018 | Bonomi .............. | H04L 63/1458 |

(Continued)

*Primary Examiner* — Phil K Nguyen (57) ABSTRACT

In some implementations, a server device may receive a request to validate a connectivity between the server device and a device associated with a cellular site. The server device may generate an ISO image that includes site-specific configuration information for the cellular site. The server device may utilize the ISO image to configure an operating system of the device. The server device may test the connectivity between the server device and the device based on configuring the operating system. The server device may perform one or more actions based on testing the connectivity between the server device and the device.

20 Claims, 8 Drawing Sheets

(56) References Cited

U.S. PATENT DOCUMENTS

| | | | | |
|---|---|---|---|---|
| 2019/0391816 A1* | 12/2019 | Lin | ........................... | G06F 8/63 |
| 2021/0051751 A1* | 2/2021 | Pawar | ..................... | H04L 67/12 |
| 2021/0096821 A1* | 4/2021 | Cui | ....................... | H04L 9/3278 |
| 2021/0165674 A1* | 6/2021 | Hu | ........................... | H04L 67/34 |
| 2022/0121502 A1* | 4/2022 | Schmitt | ................. | G06F 9/5072 |
| 2022/0239785 A1* | 7/2022 | Daniel Marcelino Barbeira | ........ | H04W 12/72 |
| 2022/0386977 A1* | 12/2022 | Baumgart | ............... | G06T 5/002 |
| 2023/0019303 A1* | 1/2023 | Suryanarayana | ....... | G06F 21/31 |
| 2023/0131220 A1* | 4/2023 | Soffer | .................. | H04W 12/03 726/26 |

* cited by examiner

SYSTEMS AND METHODS FOR DEPLOYING A DISTRIBUTED CONTAINERS-AS-A-SERVICE PLATFORM ARCHITECTURE FOR TELECOMMUNICATIONS APPLICATIONS

BACKGROUND

Containers-as-a-Service (CaaS) is a cloud-based service that assists in managing and deploying applications using containers. A container includes a stand-alone, executable package of software that includes everything needed for execution (e.g., code, runtime tools, system tools, system libraries, settings, and/or the like).

DETAILED DESCRIPTION OF EXAMPLE EMBODIMENTS

The following detailed description of example implementations refers to the accompanying drawings. The same reference numbers in different drawings may identify the same or similar elements.

A virtualization platform (e.g., a container-as-a-service (CaaS) platform) may be deployed within a telecommunications network (e.g., at a cellular site). In some cases, the virtualization platform may be utilized to support containerized network functions (e.g., rather than utilizing physical devices configured to provide the network functions). Commonly, a virtualization platform is deployed within a data center with multiple server devices implementing controller and worker functions.

However, the telecommunications network may include a large number (e.g., thousands, tens of thousands, or hundreds of thousands) of cellular sites located at an edge of the telecommunications network. The large number of cellular sites, and distances between the cellular sites and a data center, may prevent the virtualization platform from supporting containerized network functions at the cellular sites. Further, each of the cellular sites may have a limited number of server devices (e.g., 1 or 2 server devices per cellular site), which may be insufficient for implementing a virtualization platform at each cellular site.

In some cases, a service provider associated with the telecommunications network may deploy server devices to each of the cellular sites for implementing a virtualization platform to support containerized network functions at the cellular sites. Deploying a server device to a cellular site may require a technician to transport the server device to the cellular site and install the server device. Further, the technician may load virtual platform software for implementing the virtualization platform, and any server firmware upgrades that may be required, to the server device. Commonly, the virtual platform software and any server firmware upgrades are downloaded to the server device via a backhaul connection. However, the backhaul connection may have a relatively limited amount of available bandwidth and, therefore, downloading the virtualization platform software and any server firmware upgrades may take a significant amount of time (e.g., several hours). The amount of time required to download the virtualization platform software and any server firmware upgrades to a server device, when compounded by the number of cellular sites to which server devices are to be deployed, may result in a significant amount of time being required to deploy server devices to every cellular site in the telecommunications network.

In some cases, the server device may be installed incorrectly and/or the telecommunications network may be misconfigured. For example, the technician may install a cable into an incorrect port on the server device and/or may incorrectly enter the Internet Protocol (IP) address associated with the server device, which may prevent the virtualization platform from being successfully deployed. However, the improper installation and/or misconfiguration may not be identified until the virtualization platform software is downloaded and fails to execute properly, which, due to the amount of time required to download the virtualization platform software, may require the technician to wait several hours to ensure that the server device is installed and configured correctly.

Some implementations described herein enable a distributed CaaS platform architecture for implementing containerized network functions at a large number of cellular sites located at an edge of a telecommunications network. In some implementations, the distributed CaaS platform architecture may include independent CaaS clusters at each distributed site (e.g., at each cellular site) of the telecommunications network and a central controller. The independent CaaS clusters may include local controller functions and local worker functions. The central controller may be communicatively coupled to the independent CaaS clusters and may manage the lifecycle of all of the independent CaaS clusters. As a result, each independent CaaS cluster may be configured to support containerized network functions.

In some implementations, to reduce the amount of time needed to deploy the virtualization platform to the server devices installed at each independent CaaS cluster, each server device may be pre-loaded with a majority of the virtualization platform at a central facility and in a generic manner before the server devices are transported to the independent CaaS clusters. A server device pre-loaded with a majority of the virtualization platform may be transported and installed at an independent CaaS cluster.

In some implementations, upon installing the server device, an automated connectivity validation process may be initiated to ensure that the server device is correctly installed. An automation server may generate a customized ISO image with site-specific configurations (e.g., an IP address, a virtual local area network (vLAN) configuration, and/or an address of a gateway device, among other examples) built into the ISO image. The ISO image may be small relative to a size of the virtualization platform software, thereby reducing an amount of data to be downloaded to the server device. The reduction in the amount of data to be downloaded to the server device may result in reducing an amount of time required to install the server device (e.g., about 15 minutes to download the ISO image compared to several hours required to download the virtualization software platform).

The automation server may boot up the server device with the ISO image via an application program interface (API). The server device may run a lightweight operating system that boots up from remote virtual media or the like. The lightweight operating system may automatically configure the server device with site-specific networking information included in the ISO image. The automation server may perform a test to check the network connectivity based on the server device being configured with the site-specific networking information. If the test is successful (e.g., network connectivity has been established), the automation server may re-boot the server device to run the virtualization platform software utilizing the site-specific networking information configured by the lightweight operating system. If the test is unsuccessful, a notification may be provided to a user device associated with the technician installing the server device to allow the technician to correct any installation errors and/or misconfigurations that may have occurred.

Figure 1A:
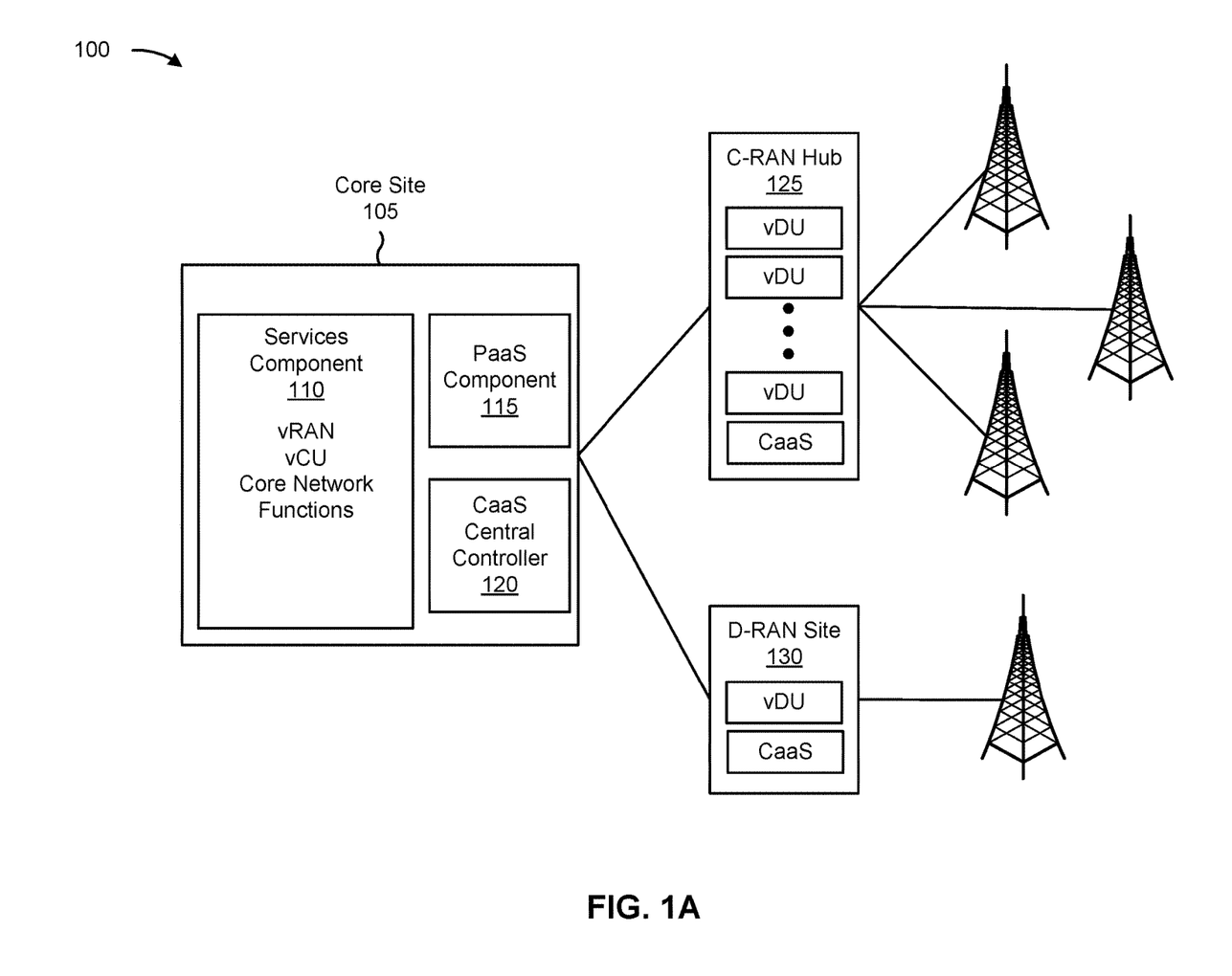
FIGS. 1A-1C are diagrams of an example environment associated with deploying a distributed container-as-a-service (CaaS) platform architecture for telecommunications applications.
Figure 1B:
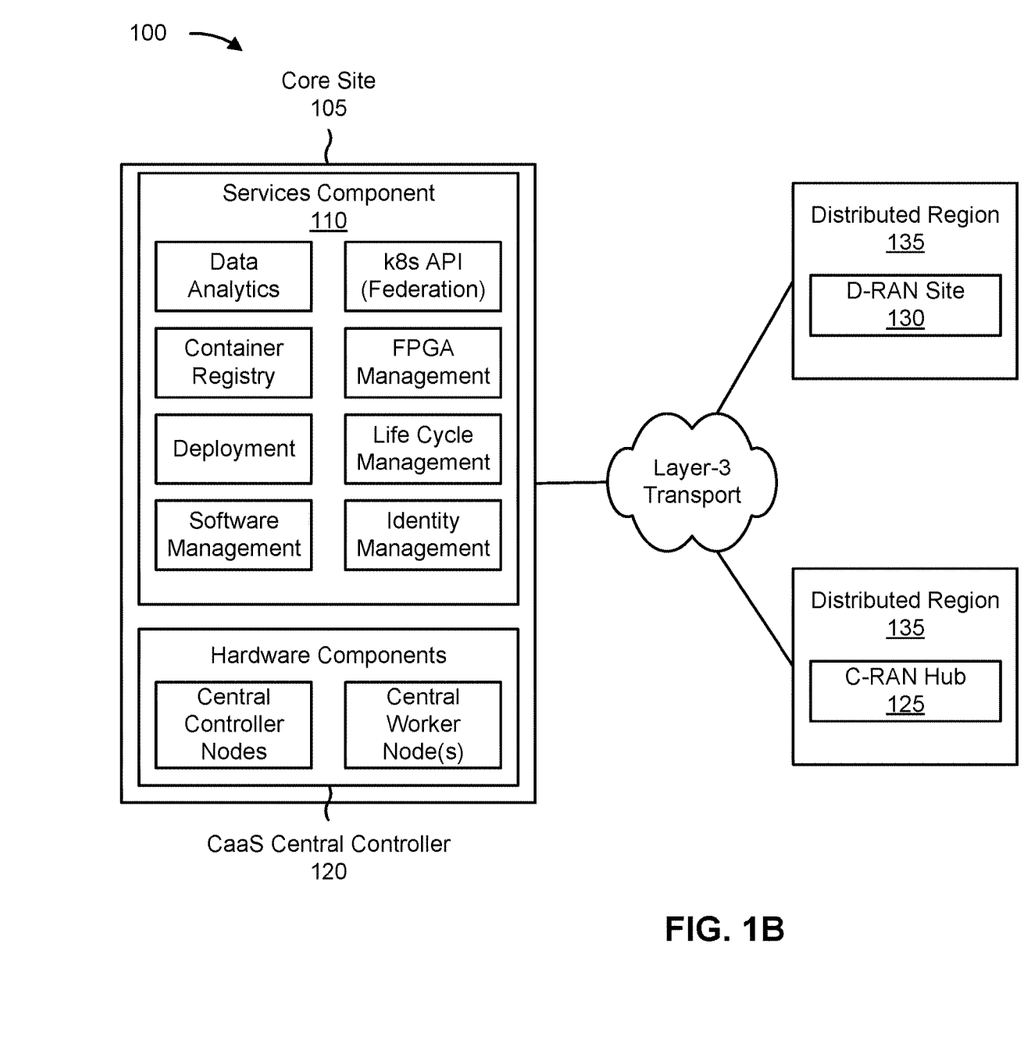
Figure 1C:
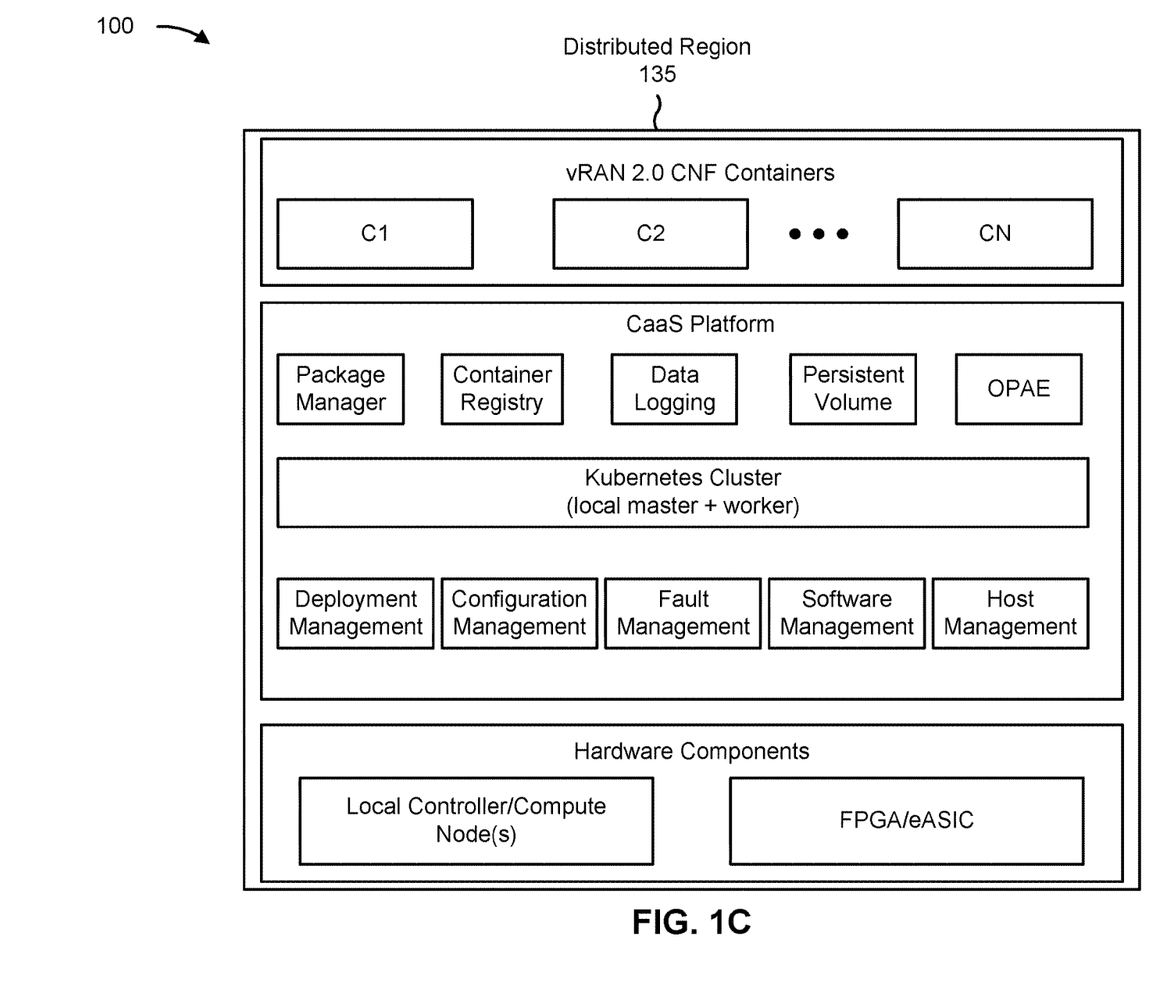

FIGS. 1A-1C are diagrams of an example 100 associated with a distributed CaaS service platform architecture for telecommunications applications. As shown in FIGS. 1A-1C, example 100 includes a core site 105 communicatively coupled to a centralized radio access network (C-RAN) hub 125 and a distributed radio access network (D-RAN) site 130. Although only a single C-RAN hub 125 and a single D-RAN site 130 are shown, in some implementations, the distributed CaaS service platform architecture may include multiple C-RAN hubs 125 and/or multiple D-RAN sites 130.

As shown in FIG. 1A, the core site 105 may include a services component 110, a platform-as-a-service (PaaS) component 115, and a CaaS central controller 120. The services component 110 may include one or more components configured to provide a virtual radio access network (vRAN), a virtual centralized unit (vCU), a set of applications, and/or a set of core network functions. For example, as shown in FIG. 1B, the services component 110 may provide a data analytics service, a Kubernetes API, a container registry, a field programmable gate array (FPGA) management service, a deployment service, a life cycle management service, a software management service, and an identity management service.

Returning to FIG. 1A, the PaaS component 115 may include one or more components configured to implement a cloud computing environment for providing hardware and/or software tools to users via a network. The PaaS component 115 may support and/or provide a cloud computing service that allows customers to provision, instantiate, run, and manage a modular bundle that includes a computing platform and one or more applications.

The CaaS central controller 120 may include one or more devices configured to implement centralized virtual software platform deployment to the C-RAN hub 125 and the D-RAN site 130 and to perform centralized lifecycle management functions (e.g., performing patching and/or upgrading functions, among other examples). As shown in FIG. 1B, the CaaS central controller 120 may include one or more central controller nodes and one or more central worker nodes implemented via a set of hardware components (e.g., one or more server devices).

Returning to FIG. 1A, the C-RAN hub 125 may implement a centralized architecture in which baseband processing is pooled at a central location. The C-RAN hub 125 may include a plurality of server devices (e.g., 2 through 100 server devices) and may implement one or more CaaS clusters. In some implementations, as shown in FIG. 1B, the C-RAN hub 125 may be included in a distributed region 135 and may be connected to the core site 105 via a Layer-3 transport network.

In some implementations, the server devices may implement one or more baseband units (BBUs) and a plurality of remote radio heads (RRHs) that can be controlled by the one or more BBUs. In some implementations, a BBU may provide a physical interface between the C-RAN hub 125 and the core site 105, provide an interface to the multiple RRHs, process and transfer uplink and downlink data packages, and/or schedule transmissions to and/or from user equipment connected to a network associated with the C-RAN hub 125.

The RRHs may be connected to an array of antennas of a base station to transmit and receive signals with a wireless network. The RRHs may contain the radio frequency (RF) circuitry, analog-to-digital converters, digital-to-analog converters, and/or the like for the associated base station.

In some implementations, the BBU may be connected to the RRHs via a front haul. The front haul may be a network, a connection, and/or a set of connections between the BBUs and the set of RRHs. The front haul may allow the RRHs to be installed at or near an antenna atop a cellular tower.

The one or more CaaS clusters may be configured to implement a plurality of virtual distributed units (vDUs). In some implementations, the plurality of vDUs may be implemented as a plurality of containerized functions via a virtualization software platform (e.g., a CaaS platform, as shown in FIG. 1C) implemented by the one or more CaaS clusters.

In some implementations, the one or more CaaS clusters may include local controller and worker functions for supporting the implementation and control of the vDUs. The vDUs may be associated with a plurality of base stations (e.g., a plurality of RRHs) and may provide support for the lower layers of the protocol stack such as the radio link control (RLC) layer, the media access control (MAC) layer, and the physical (PHY) layer.

The one or more CaaS clusters may provide local control-plane functions within a distributed region (e.g., within a C-RAN hub 125 or a D-RAN site 130), thereby providing a high level of resiliency to the distributed region. Further, the one or more CaaS clusters may provide a loose coupling between the local control-plane functions and centralized control-plane functions provided by the core site 105, which may allow for high scalability (e.g., over 10,000) of the distributed clusters.

The D-RAN site 130 may implement a distributed architecture in which a BBU is associated with each base station. The BBUs of various base stations associated with the D-RAN site 130 may communicate via a backhaul. The D-RAN site 130 may include one or two server devices and may implement one or more CaaS clusters in a manner similar to that described above with respect to the C-RAN hub 125.

FIG. 1C is a diagram of example components of a distributed region 135 (e.g., example components of a C-RAN hub 125 and/or a D-RAN site 130). As shown in FIG. 1C, the distributed region 135 may implement a virtualization software platform (e.g., a CaaS platform, as shown) that is configured to support a set of containerized core network functions (CNF) provided by the distributed region 135.

In some implementations, the virtualization software platform may be implemented on one or more hardware components. For example, the virtualization software platform may be implemented on one or more server devices located at a C-RAN hub 125 or a D-RAN site 130. The virtualization software platform may include a local master component and a local worker component for implementing and/or providing a set of functions and/or applications. For example, as shown in FIG. 1C, the virtualization software platform may include a Kubernetes cluster for implementing and/or providing a package manager, a container registry, data logging, a persistent volume, an open programmable acceleration engine (OPAE), a deployment management function, a configuration management function, a fault management function, a software management function, and a host management function.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
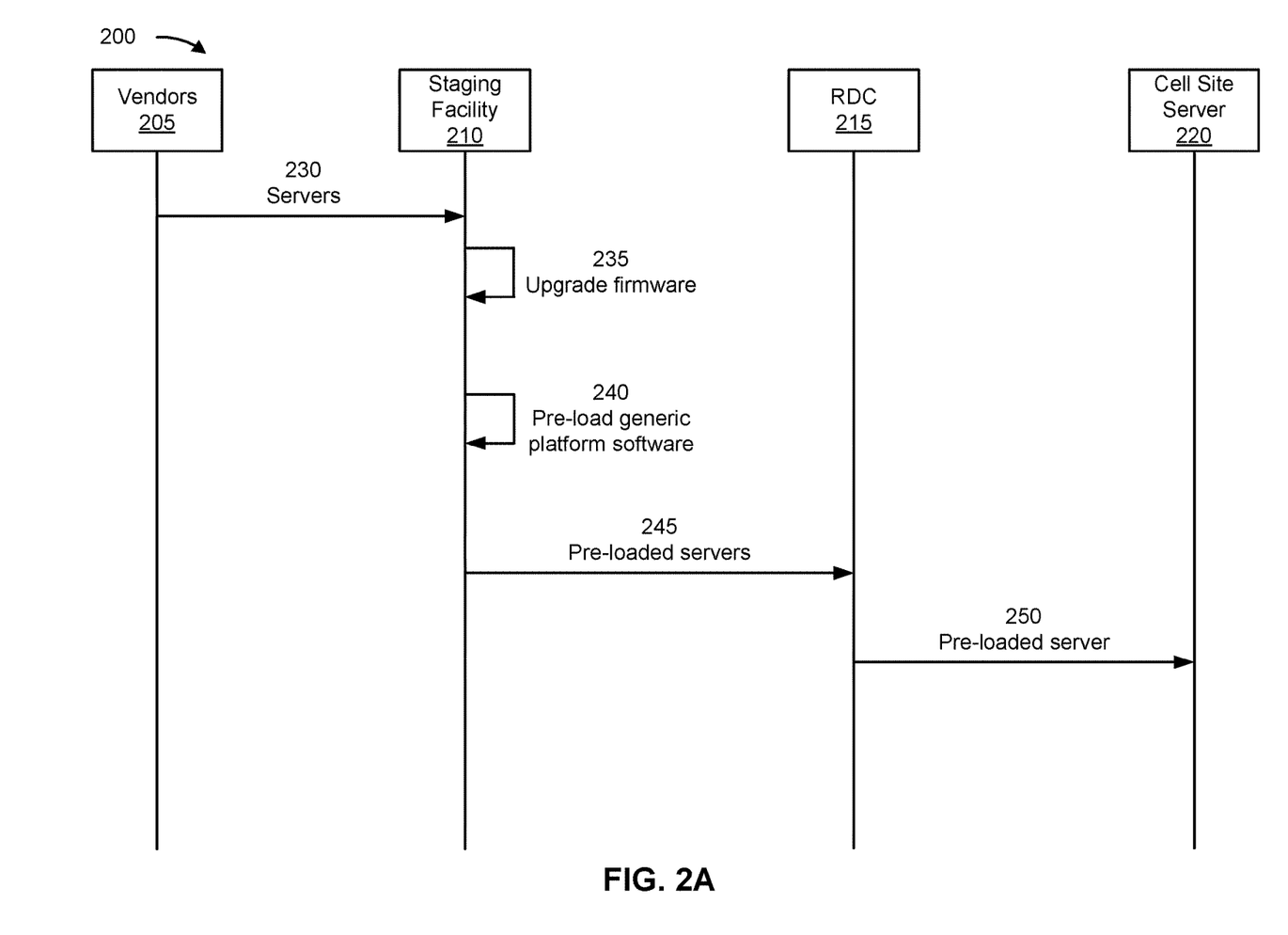
FIGS. 2A and 2B are diagrams of an example associated with deploying a distributed CaaS platform architecture for telecommunications applications.
Figure 2B:
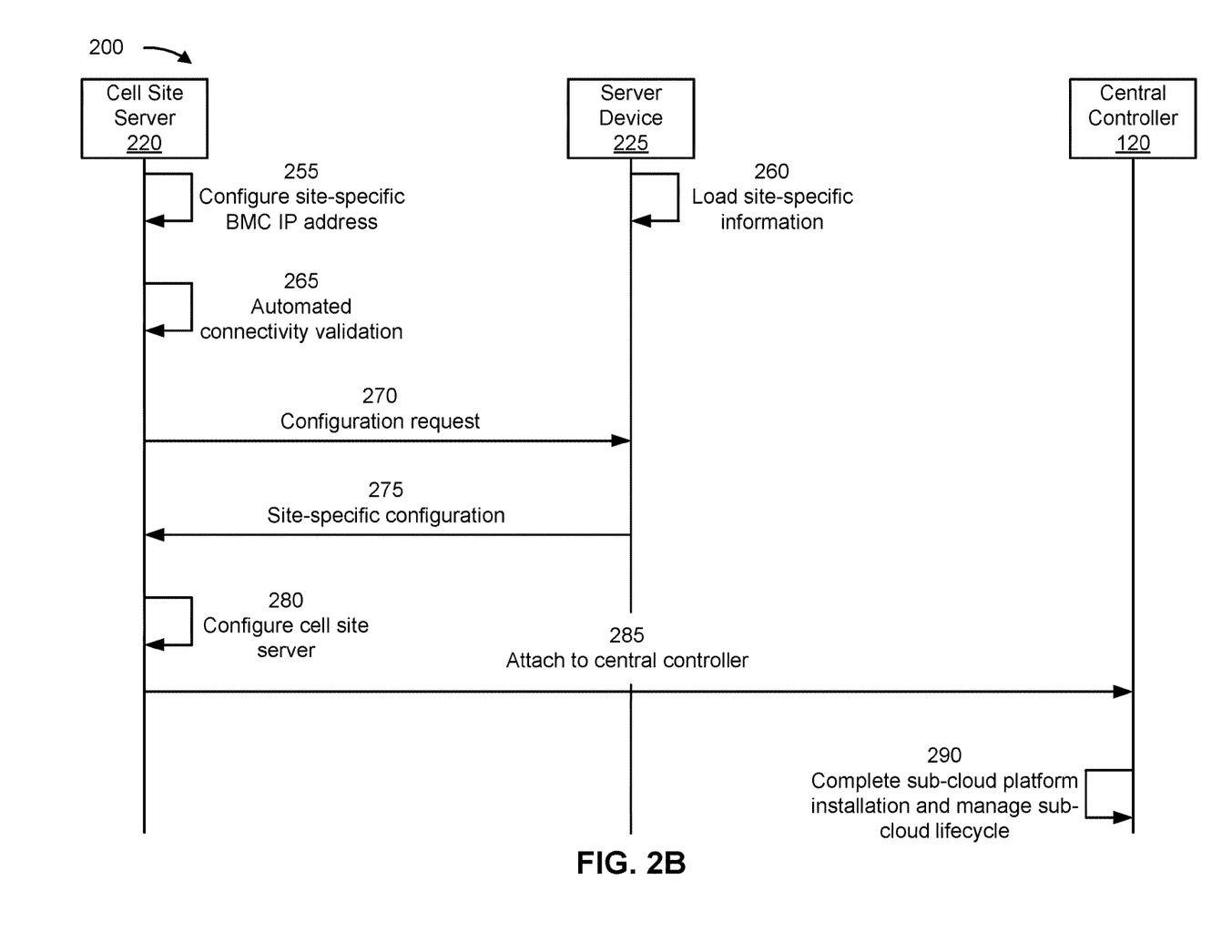

FIGS. 2A and 2B are diagrams of an example 200 associated with deploying a distributed CaaS platform architecture for telecommunications applications. As shown in FIGS. 2A and 2B, example 200 includes vendors 205, a staging facility 210, a regional distribution center (RDC) 215, a cell site server 220 (e.g., a server device installed at a cellular site), a server device 225, and a CaaS central controller 120.

As shown in FIG. 2A, and by reference number 230, one or more vendors 205 may provide a plurality of server devices to a staging facility 210. For example, a telecommunications service provider may purchase, from one or more vendors 205, a plurality of server devices (e.g., thousands or tens of thousands of server devices) for deploying a distributed CaaS platform architecture, and the one or more vendors 205 may deliver the plurality of server devices to a staging facility 210 (e.g., a warehouse, an office building, and/or another type of structure suitable for storing a plurality of server devices and performing one or more actions described herein).

As shown by reference number 235, firmware of the plurality of server devices may be upgraded based on the server devices being received at the staging facility 210. For example, the plurality of server devices may be connected to a network, and a control device (e.g., a server device configured to perform one or more functions for upgrading the firmware of the server devices) may cause a latest version of firmware to be downloaded and/or installed on the plurality of server devices.

As shown by reference number 240, generic virtualization platform software (e.g., CaaS platform software) may be pre-loaded on the plurality of server devices. The generic virtualization platform software may include components of a virtualization platform that are common to all of the distributed regions (e.g., cellular sites such as a C-RAN hub 125 and/or a D-RAN site 130). The generic virtualization platform software may not be configured with any site-specific information. For example, site-specific information such as an operations, administration, and maintenance (OAM) IP address may be not configured, omitted, or configured to correspond to a generic placeholder IP address.

In some implementations, one or more templates may be utilized to pre-load the generic virtualization platform software. The template may be configured to receive site specific information as an input and/or include a list of tasks for pre-loading the generic virtualization platform software. In some implementations, the template may include an ansible playbook and the control device (e.g., the CaaS central controller 120) may push the template to the plurality of server devices to cause the list of tasks to be executed (e.g., by a set of ansible modules) to pre-load the generic virtualization platform software on the plurality of server devices.

Because only generic virtualization platform software is loaded onto the plurality of server devices, the plurality of server devices may be installed at any cellular site. Therefore, the plurality of server devices may not need to be tagged or otherwise marked with information indicating the particular cellular site for which the server devices are configured, which may reduce the amount of time required to deploy the server devices to the cellular sites and/or may save computing resources (e.g., processor resources, memory resources, and/or communication resources) that may otherwise be utilized to track and manage the deployment of the server devices to the particular cellular sites for which the server devices are configured.

As shown by reference number 245, the plurality of server devices may be transported to one or more RDCs 215. Because only generic virtualization platform software is loaded onto the plurality of server devices, the RDC 215 may not need to analyze tags and/or other information marked on the server devices to determine one or more particular cellular sites at which the server devices are to be installed. Instead, a user (e.g., a technician) tasked to install a server device at a particular cellular site may select any server device from the plurality of server devices and, as shown by reference number 250, may transport the selected server device (e.g., cell site server 220) to the particular cellular site.

As shown in FIG. 2B, and by reference number 255, the cell site server 220 may be installed and configured with a baseboard management controller (BMC) IP address associated with the particular cellular site (e.g., a site-specific BMC IP address). The BMC IP address may enable a BMC or a service processor to provide pre-operating system management functions for the cell site server 220. For example, the BMC may communicate with the server device 225 (e.g., a server device located at the core site 105) to provide the server device 225 with information indicating that the cell site server 220 is being installed at the cellular site.

In some implementations, as shown by reference number 260, the server device 225 may load site-specific information associated with cell site server 220. For example, the server device 225 may load site-specific information associated with the cell site server 220 based on the cell site server 220 providing the information indicating that the cell site server 220 is being installed at the cellular site. The site specific information may include one or more serial numbers associated with the cell site server 220, one or more addresses (e.g., a baseboard management controller (BMC) IP address), vendor information associated with the cell site server 220, one or more passwords associated with the cell site server (e.g., a BMC password, described below), and/or the like.

In some implementations, the site-specific information may include customer information questionnaire (CIQ) data. The CIQ data may include information indicating site-specific parameters for the cell site server 220 and/or information utilized to generate one or ore site-specific parameters for the cell site server 220.

In some implementations, the site-specific information may include a BMC password for a BMC associated with the cell site server 220. The BMC may enable the server device 225 to perform one or more tasks associated with remotely managing and/or monitoring applications and functions executing on the cell site server 220. In some implementations, the BMC password may be generated by the server device 225. For example, the server device 225 may generate a unique BMC password associated with the cell site server 220 based on receiving the indicating that the cell site server 220 is being installed at the cellular site.

In some implementations, the server device 225 may perform one or more tasks associated with the cell site server 220 is being installed at the cellular site. For example, the server device 225 may link a serial number associated with the cell site server 220 to the CIQ data and/or may update a domain name server (DNS) with information associated with the cell site server 220, among other examples.

As shown by reference number 265, an automated connectivity validation process may be performed based on the cell site server 220 being installed at the cellular site. The automated connectivity validation process may be performed to determine whether connectivity has been established at the cell site server 220. The performance of the automated connectivity validation process is described in greater detail below with respect to FIG. 3.

As shown by reference number 270, the cell site server 220 may provide a configuration request to the server device 225. For example, the cell site server 220 may provide a configuration request requesting site-specific configuration information for the cell site server 220 based on receiving information indicating a successful result of performing the automated connectivity validation process from the server device 225.

As shown by reference number 275, the server device 225 may receive the configuration request and may provide the site-specific configuration information to the cell site server 220. As shown by reference number 280, the cell site server 220 may be configured based on the site-specific configuration information. In some implementations, the cell site server 220 may be configured based on the site-specific configuration information as described in greater detail below with respect to FIG. 3.

As shown by reference number 285, the cell site server 220 may attach to the CaaS central controller 120 associated with the core site 105 based on the cell site server 220 being configured with the site-specific configuration information. As shown by reference number 290, the CaaS central controller 120 may complete sub-cloud platform installation for the cell site server 220 (e.g., may enable the cell site server 220 to implement a set of CNFs) and may manage sub-cloud lifecycles of the local virtual components implemented by the cell site server 220.

As indicated above, FIGS. 2A and 2B are provided as an example. Other examples may differ from what is described with regard to FIGS. 2A and 2B. The number and arrangement of devices shown in FIGS. 2A and 2B are provided as an example. In practice, there may be additional devices, fewer devices, different devices, or differently arranged devices than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) shown in FIGS. 2A and 2B may perform one or more functions described as being performed by another set of devices shown in FIGS. 2A and 2B.

Figure 3:
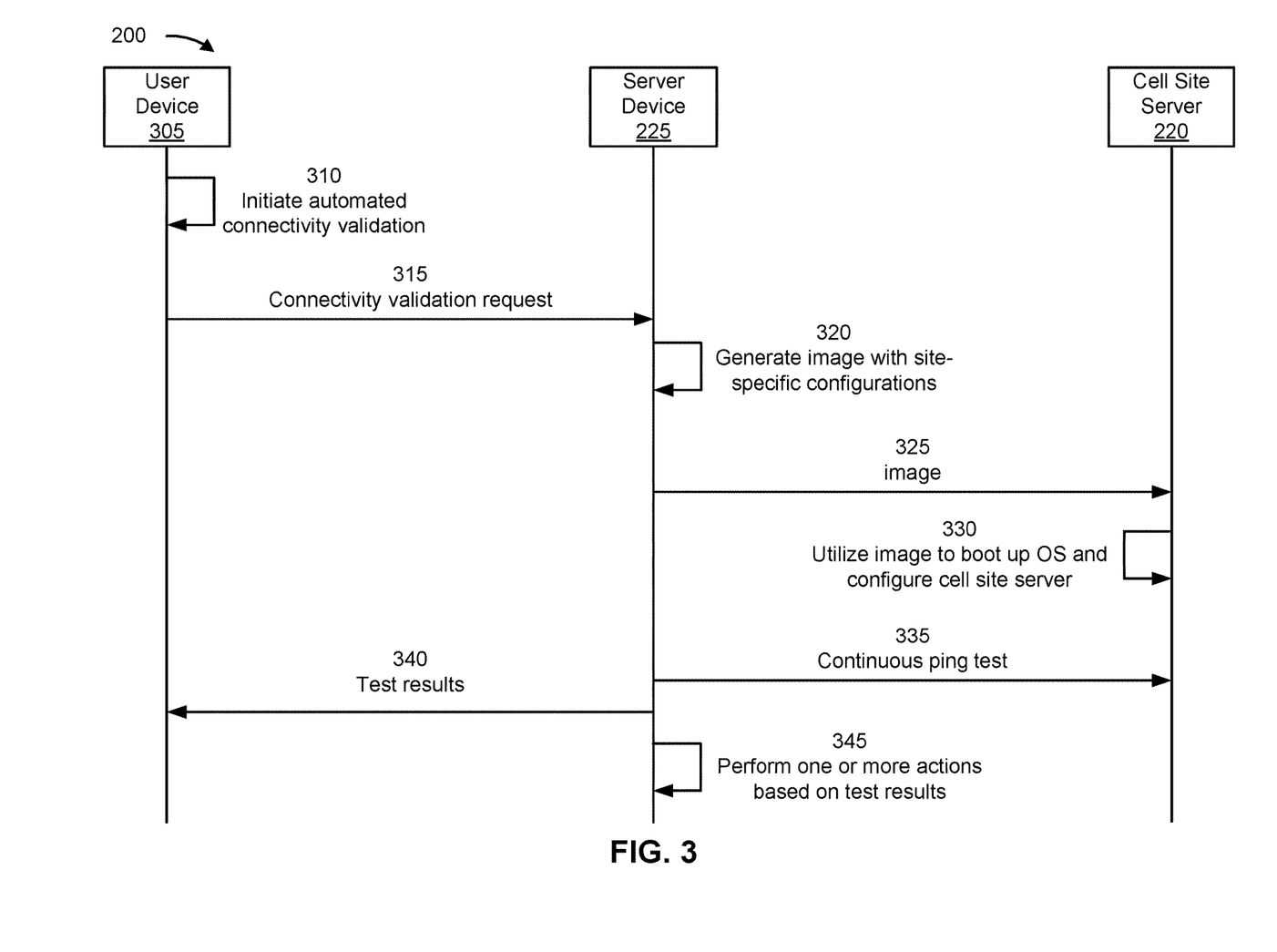
FIG. 3 is a diagram of an example associated with automatically validating a connection within a distributed CaaS platform architecture for telecommunications applications.

FIG. 3 is a diagram of an example 300 associated with deploying a distributed CaaS platform architecture for telecommunications applications. As shown in FIG. 3, example 300 includes a user device 305, a cell site server 220, and a server device 225.

The user device 305 may be associated with a user installing the cell site server 220 at a cellular site. The user device 305 may include one or more devices capable of receiving, generating, storing, processing, and/or providing information associated with deploying a distributed CaaS platform architecture for telecommunications applications, as described elsewhere herein. The user device 305 may include a communication device and/or a computing device. For example, the user device 305 may include a wireless communication device, a mobile phone, a user equipment, a laptop computer, a tablet computer, a wearable communication device (e.g., a smart wristwatch), or a similar type of device.

In some implementations, the server device 225 may include the CaaS central controller 120. The server device 225 may utilize the CaaS central controller 120 to test connectivity between the cell site server 220 and the server device 225, to determine that firmware of the cell site server 220 is to be upgraded, cause the firmware of the cell site server 220 to be upgraded, deploy one or more containerized applications to the cell site server 220, manage a life cycle of the one or more containerized applications, and/or the like.

In some implementations, as shown by reference number 310, after the cell site server 220 is installed at the cellular site, an automated connectivity validation process may be initiated to test whether connectivity has been established at the cellular site. For example, the user device 305 may include an application for initiating the connectivity validation process and/or receiving information indicating a result of performing the connectivity validation process.

After installing the cell site server 220 at the cellular site, the user may access the application via the user device 305. In some implementations, the application may authenticate the user based on the user accessing the application. For example, the application may require the user to input a valid set of credentials (e.g., a username and password) associated with the user. The application may provide a user interface via a display of the user device 305. The user interface may include a field, a selectable display element, and/or a drop-down window that enables the user to input information requesting performance of the automated connectivity validation process based on successfully authenticating the user. The user may input the information requesting performance of the automated connectivity validation process via the user interface.

As shown by reference number 315, the application may receive the input information and may cause the user device 305 to provide a connectivity validation request to the server device 225. The connectivity validation request may include information associated with the cell site server 220, information associated with the cellular site, and/or other information required by the server device 225 to determine whether connectivity is established at the cellular site.

As shown by reference number 320, the server device 225 may generate an image with site-specific configurations for the cellular site based on receiving the connectivity validation request from the user device 305. For example, the server device 225 may generate an ISO image that includes an IP address associated with the cell site server 220, a virtual local area network (vLAN) configuration associated with the cell site server 220, and/or information associated with a gateway device included in a network associated with the cell site server 220, among other examples. The generation of the image with the site-specific configuration by the server device 225 may enable fully automated testing of the cell site server 220 without human intervention or manual IP address configuration.

In some implementations, the image includes a lightweight operating system. A lightweight operating system may be an operating system having a size within a range of 70 MB through 100 MB (rather than a size of a full operating system of about 2.5 GB). The lightweight operating system may run only from a random access memory (RAM) of the cell site server 220 (e.g., rather than from a hard drive of the cell site server 220). Running the lightweight operating system from the RAM may enable the lightweight operating system to quickly boot-up and perform the connectivity validation process (e.g., in less than 10 minutes). In some implementations, running the lightweight operating system from the RAM may enable the lightweight operating system to perform the connectivity validation process in a non-intrusive manner (e.g., without affecting any existing operating system and/or services installed on the cell site server 220).

In some implementations, the lightweight operating system may include a secure shared (SSH) server. The SSH server may enable a user to remotely access the cell site server 220 (e.g., to perform one or more remedial actions when a result of performing the connectivity validation process indicates that connectivity is not established at the cell site server 220).

As shown by reference number 325, the server device 225 may provide the image to the cell site server 220. In some implementations, the image is loaded on the cell site server 220 via remote virtual media. Loading the image via the remote virtual media may allow the image to be loaded via a centralized operation performed at the core site 105 (e.g., by the server device 225), which may increase a level of security relative to a user manually loading the image at the cellular site.

As shown by reference number 330, the image may be utilized to boot-up the lightweight operating system. For example, the server device 225 may cause the lightweight operating system to be booted up from the remote virtual media. The lightweight operating system may obtain site-specific configurations from the image and may configure the cell site server 220 based on the site-specific configurations.

In some implementations, the lightweight operating system may perform one or more additional actions based on configuring the cell site server 220. For example, the lightweight operating system may determine whether network interface card (MC) firmware associated with a MC of the cell site server 220 is a latest version of the MC firmware, may update the NIC firmware when the MC firmware is not the latest version of the MC firmware, may perform a health-check test to determine whether a component of the cell site server 220 has failed or is working improperly, and/or may perform one or more server preparation functions to prepare the cell site server 220 to run the virtualization platform software that has been pre-loaded onto the cell site server 220.

In some implementations, the server device 225 may perform one or more actions to determine whether connectivity is established at the cell site server 220 based on the lightweight operating system configuring the cell site server 220 with the site-specific configuration. In some implementations, as shown by reference number 335, the server device 225 may perform a continuous ping test to determine whether connectivity is established at the cell site server 220. Alternatively, and/or additionally, the server device 225 may perform one or more other tests to determine whether connectivity is established at the cell site server 220.

As shown by reference number 340, the server device 225 may provide a result of performing the connectivity validation process (e.g., a result of performing the continuous ping test) to the user device 305. The result may indicate whether connectivity is established at the cell site server 220. The user device 305 may receive the result and may provide the result to the user. For example, the user device 305 may provide the result via a user interface of the application associated with initiating the connectivity validation process.

In some implementations, the result may indicate that connectivity is established at the cell site server 220. The user may review the result and may determine that the cell site server 220 is properly installed and configured.

In some implementations, the result may indicate that connectivity is not established at the cell site server 220. The user may review the result and may determine that the cell site server 220 is not properly installed and/or is not properly configured based on the result indicating that connectivity is not established at the cell site server 220. The user may perform one or more actions to establish connectivity at the cell site server 220.

In some implementations, the result may include information identifying one or more troubleshooting steps to be performed by the user based on the result indicating that connectivity is not established at the cell site server 220. The user may perform the one or more troubleshooting steps indicated in the result.

In some implementations, the user may determine that an installation error and/or a misconfiguration has been corrected and that the cell site server 220 is properly installed and/or configured based on performing the one or more troubleshooting steps. The user may initiate the performance of another connectivity validation process based on determining that the installation error and/or the misconfiguration has been corrected. In some implementations, the user may initiate the performance of another connectivity validation process in a manner similar to that described above.

As shown by reference number 345, the server device 225 may perform one or more actions based on the test results. In some implementations, the test results may indicate that connectivity is established at the cell site server 220 and the one or more actions may include the server device 225 re-booting the cell site server 220 to cause the cell site server 220 to install and/or utilize a full operating system and/or run the virtualization platform software. In some implementations, the test results may indicate that connectivity is not established at the cell site server 220 and the one or more actions may include the server device 225 causing the cell site server 220 to continue running the lightweight operating system, the server device 225 performing another connectivity validation process based on receiving a request from the user device 305, and/or providing test results associated with performing another connectivity validation process to the user device 305.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
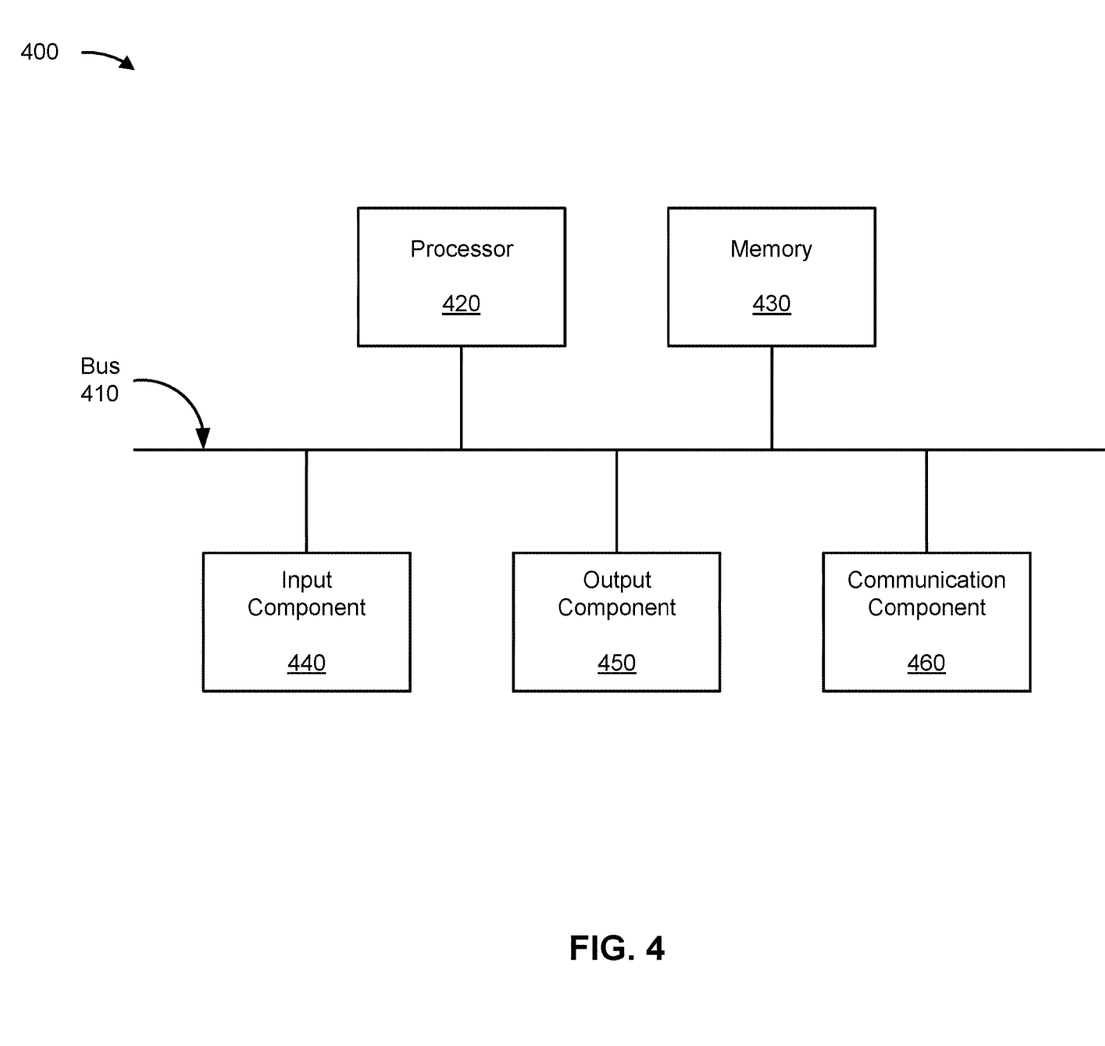
FIG. 4 is a diagram of example components of one or more devices of FIGS. 1A-1C, 2A, 2B, and 3.

FIG. 4 is a diagram of example components of a device 400, which may correspond to core site 105, services component 110, PaaS component 115, CaaS central controller 120, C-RAN hub 125, D-RAN site 130, cell site server 220, server device 225, and/or user device 305. In some implementations, core site 105, services component 110, PaaS component 115, CaaS central controller 120, C-RAN hub 125, D-RAN site 130, cell site server 220, server device 225, and/or user device 305 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
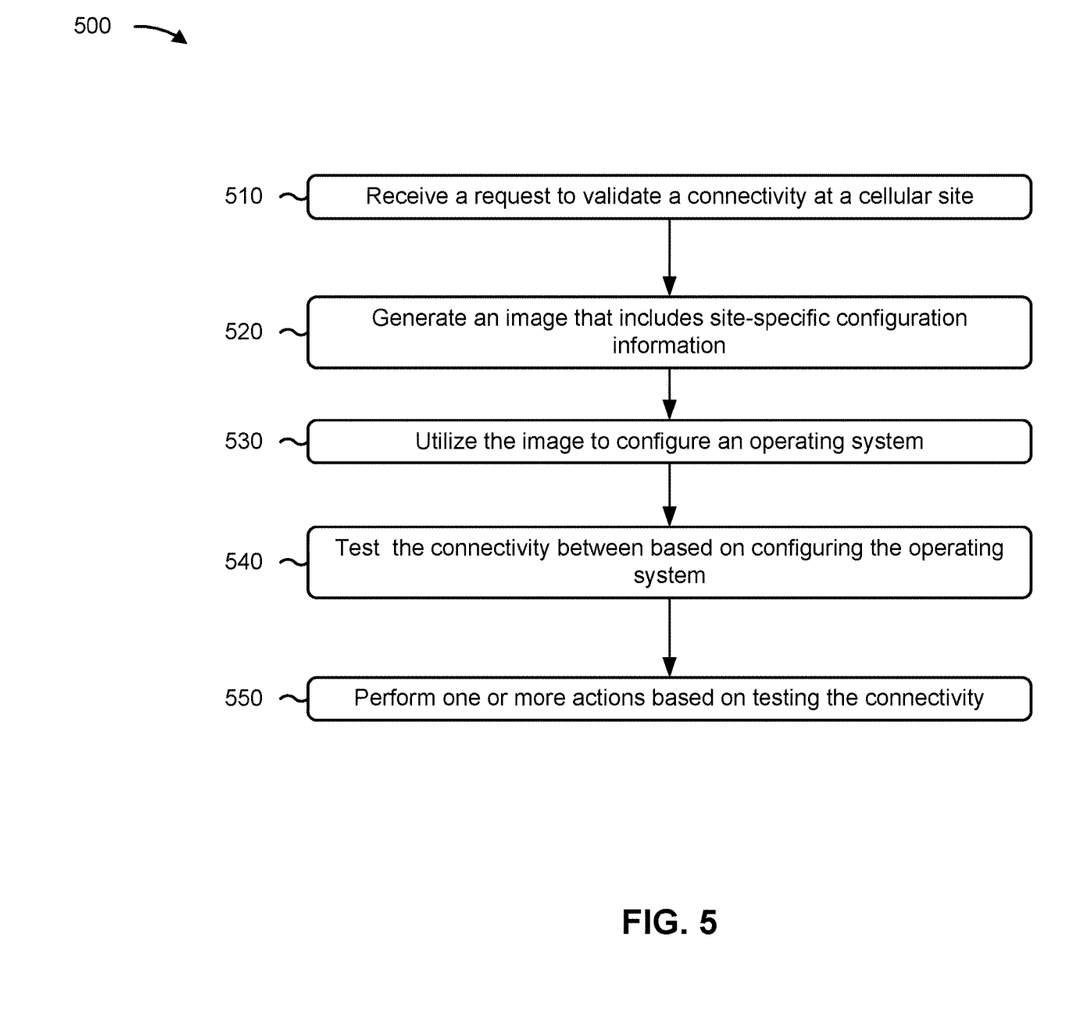
FIG. 5 is a flowchart of an example process relating to deploying a distributed CaaS platform architecture for telecommunications applications.

FIG. 5 is a flowchart of an example process 500 associated with systems and methods for deploying a distributed CaaS platform architecture for telecommunications applications. In some implementations, one or more process blocks of FIG. 5 may be performed by a server device (e.g., server device 225). In some implementations, one or more process blocks of FIG. 5 may be performed by another device or a group of devices separate from or including the server device, such as a core site (e.g., core site 105), a services component (e.g., services component 110), a PaaS component (e.g., PaaS component 115), a CaaS central controller (e.g., CaaS central controller 120), a C-RAN hub (e.g., C-RAN hub 125), a D-RAN site (e.g., D-RAN site 130), a cell site server (e.g., cell site server 220), a server device (e.g., server device 225), and/or a user device (e.g., user device 305). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a request to validate a connectivity at a cellular site (block 510). For example, the server device may receive a request to validate a connectivity between the server device and a device associated with a cellular site, as described above. In some implementations, the device may be located at an edge of a cellular network. For example, the device may include an edge server device installed at a cellular site.

As further shown in FIG. 5, process 500 may include generating an ISO image that includes site-specific configuration information (block 520). For example, the server device may generate an ISO image that includes site-specific configuration information for the cellular site, as described above. In some implementations, the ISO image includes a lightweight operating system configured to utilize the site-specific configuration information to configure the device and/or to establish connectivity with the cellular network at the cellular site.

As further shown in FIG. 5, process 500 may include utilizing the ISO image to configure an operating system (block 530). For example, the server device may utilize the ISO image to configure an operating system of the device, as described above.

In some implementations, the ISO image is loaded on the device from remote virtual media. In some implementations, the operating system of the device is a lightweight operating system. In some implementations, the operating system runs from a RAM of the device (e.g., rather than from a hard drive of the device). In some implementations, the operating system includes an SSH server that enables a user to remotely access the device.

As further shown in FIG. 5, process 500 may include testing the connectivity based on configuring the operating system (block 540). For example, the server device may test the connectivity between the server device and the device based on configuring the operating system, as described above.

As further shown in FIG. 5, process 500 may include performing one or more actions based on testing the connectivity (block 550). For example, the server device may perform one or more actions based on testing the connectivity between the server device and the device, as described above.

In some implementations, performing the one or more actions may comprise the server device providing information indicating a result of testing the connectivity between the server device and the device to a user device. In some implementations, the user device may be user device from which the request to validate the connectivity between the server device and the device was received.

In some implementations, performing the one or more actions comprises the server device validating the connectivity between the server device and the device based on a result of testing the connectivity between the server device and the device. For example, the server device may determine that connectivity is established at the cellular site based on the result of testing the connectivity between the server device and the device. The server device may reboot the device based on validating the connectivity between the server device and the device.

In some implementations, performing the one or more actions comprises the server device determining that the connectivity between the server device and the device has not been established based on a result of testing the connectivity between the server device and the device. For example, the result of testing the connectivity between the server device and the device may indicate that connectivity is not established at the cellular site. The server device may provide, to a user device from which the request to test the connectivity between the server device and the device was received, information indicating that connectivity at the cellular site has not been established (e.g., information indicating that connectivity between the server device and the device has not been established) or information indicating one or more actions for establishing connectivity a the cellular site (e.g., information indicating one or more troubleshooting steps for establishing connectivity between the server device and the device).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a central controller implemented on a server device associated with a central region, a request to validate connectivity between the server device and a device associated with a cellular site,
   wherein the device includes a controller Internet Protocol (IP) address configured to enable a controller associated with the device;
   generating, by the central controller and based on receiving the request to validate the connectivity between the server and the device, an image file that includes site-specific configuration information for the cellular site,
   wherein the site-specific configuration information includes a controller password generated by the server device;
   utilizing, by the central controller, the image file to remotely install and configure an operating system of the device;
   testing, by the central controller, the connectivity between the server device and the device based on remotely installing and configuring the operating system; and
   performing, by the central controller, one or more actions based on testing the connectivity between the server device and the device.

2. The method of claim 1, wherein performing the one or more actions comprises:
   providing information indicating a result of testing the connectivity between the server device and the device to a user device from which the request to validate the connectivity between the server device and the device was received.

3. The method of claim 1, wherein performing the one or more actions comprises:
   validating the connectivity between the server device and the device based on a result of testing the connectivity between the server device and the device; and
   rebooting the device based on validating the connectivity between the server device and the device.

4. The method of claim 1, wherein performing the one or more actions comprises:
   determining that the connectivity between the server device and the device has not been established based on a result of testing the connectivity between the server device and the device; and
   providing, to a user device from which the request to validate the connectivity between the server device and the device was received, one or more of information indicating the connectivity between the server device and the device has not been established or information indicating one or more actions for establishing the connectivity between the server device and the device.

5. The method of claim 1, wherein the operating system of the device runs from a random access memory (RAM) of the device.

6. The method of claim 1, wherein the image file is loaded on the device from a remote virtual media.

7. The method of claim 1, wherein the operating system of the device includes a secure shell (SSH) server.

8. The method of claim 1, wherein the device comprises an edge server device located at an edge of a cellular network.

9. A non-transitory computer-readable medium storing a set of instructions, the set of instructions comprising:
   one or more instructions that, when executed by one or more processors of a server device, cause the server device to:
   receive a request to validate a connectivity between the server device and a device associated with a cellular site,
   wherein the device is associated with a controller Internet Protocol (IP) address configured to enable a controller associated with the device to communicate with the server device;
   generate, based on receiving the request, an image file that includes site-specific configuration information for the cellular site,
   wherein the site-specific configuration information includes a password associated with the controller;
   utilize the image file to remotely install and configure an operating system of the device; test the connectivity between the server device and the device based on remotely installing and configuring the operating system; and
   perform one or more actions based on testing the connectivity between the server device and the device.

10. The non-transitory computer-readable medium of claim 9, wherein the one or more instructions, that cause the server device to perform the one or more actions, cause the server device to:
    provide information indicating a result of testing the connectivity between the server device and the device to a user device from which the request to validate the connectivity between the server device and the device was received.

11. The non-transitory computer-readable medium of claim 9, wherein the one or more instructions, that cause the server device to perform the one or more actions, cause the server device to:
    validate the connectivity between the server device and the device based on a result of testing the connectivity between the server device and the device; and
    reboot the device based on validating the connectivity between the server device and the device.

12. The non-transitory computer-readable medium of claim 9, wherein the one or more instructions, that cause the server device to perform the one or more actions, cause the server device to:
    determine that the connectivity between the server device and the device has not been established based on a result of testing the connectivity between the server device and the device; and
    provide, to a user device from which the request to validate the connectivity between the server device and the device was received, one or more of information indicating the connectivity between the server device and the device has not been established or information indicating one or more actions for establishing the connectivity between the server device and the device.

13. The non-transitory computer-readable medium of claim 9, wherein the operating system of the device runs from a random access memory (RAM) of the device.

14. The non-transitory computer-readable medium of claim 9, wherein the image file is loaded on the device from a remote virtual media.

15. The non-transitory computer-readable medium of claim 9, wherein the operating system of the device includes a secure shell (SSH) server.

16. The non-transitory computer-readable medium of claim 9, wherein the device comprises an edge server device located at an edge of a cellular network.

17. A server device, comprising:
one or more processors configured to:
receive a request to validate a connectivity between the server device and a device associated with a cellular site,
wherein the device is associated with a controller Internet Protocol (IP) address configured to enable a controller associated with the device to provide the server device with information related to installing an operating system of the device at the cellular site;
generate, based on receiving the request, an image file that includes site-specific configuration information for the cellular site,
wherein the site-specific configuration information includes a password associated with the controller;
utilize the image file to remotely install and configure the operating system of the device;
test the connectivity between the server device and the device based on remotely installing and configuring the operating system; and
perform one or more actions based on testing the connectivity between the server device and the device.

18. The server device of claim 17, wherein the one or more processors, to perform the one or more actions, are configured to:
provide information indicating a result of testing the connectivity between the server device and the device to a user device from which the request to validate the connectivity between the server device and the device was received.

19. The server device of claim 17, wherein the one or more processors, to perform the one or more actions, are configured to:
validate the connectivity between the server device and the device based on a result of testing the connectivity between the server device and the device; and
reboot the device based on validating the connectivity between the server device and the device.

20. The server device of claim 17, wherein the one or more processors, to perform the one or more actions, are configured to:
determine that the connectivity between the server device and the device has not been established based on a result of testing the connectivity between the server device and the device; and
provide, to a user device from which the request to validate the connectivity between the server device and the device was received, one or more of information indicating the connectivity between the server device and the device has not been established or information indicating one or more actions for establishing the connectivity between the server device and the device.

* * * * *